Patented July 7, 1925.

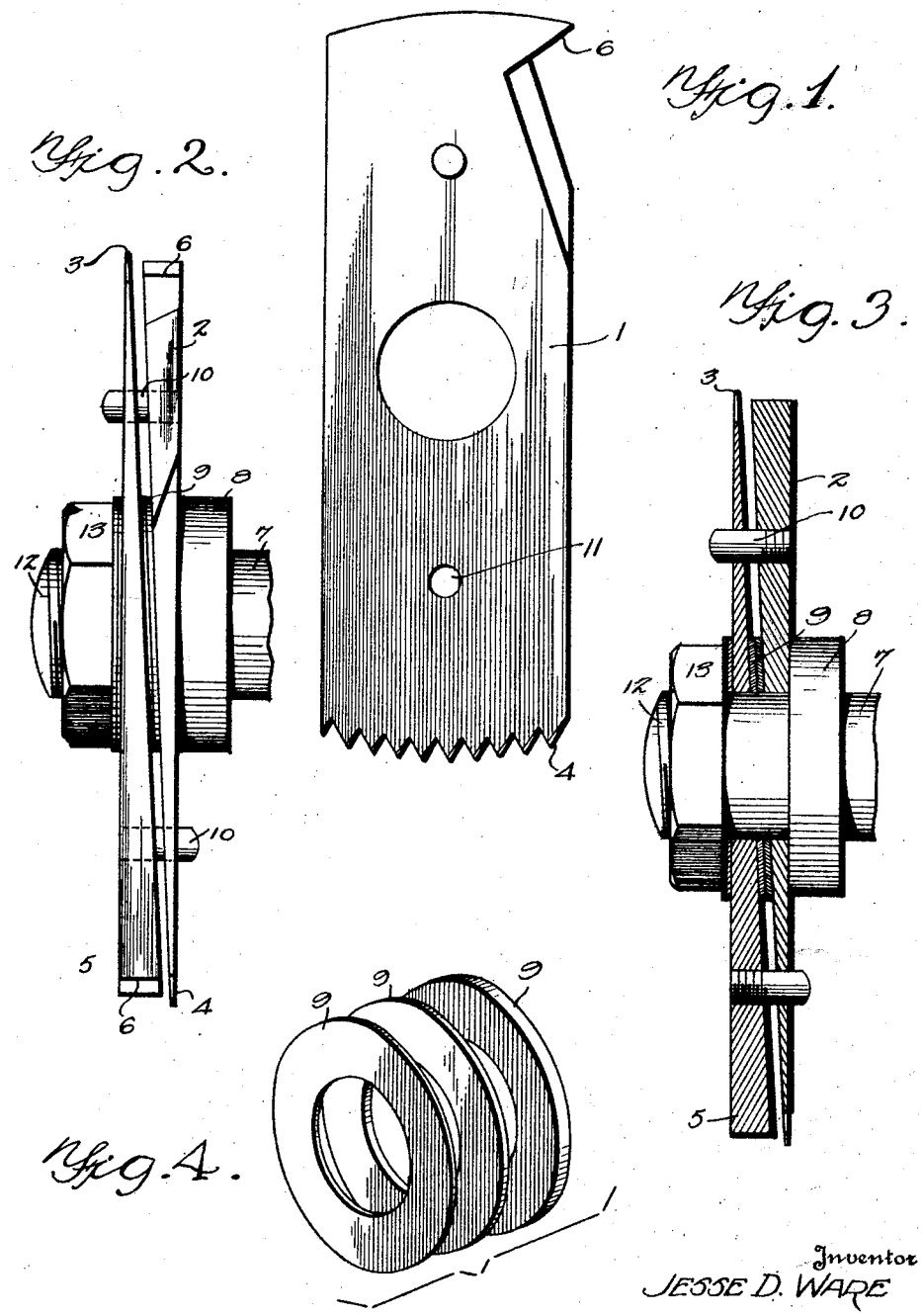

1,545,293

UNITED STATES PATENT OFFICE.

JESSE D. WARE, OF SAVANNAH, GEORGIA.

WOODWORKING TOOL.

Application filed July 11, 1924. Serial No. 725,494.

*To all whom it may concern:*

Be it known that I, JESSE D. WARE, a citizen of the United States, residing at Savannah, in the county of Chatham and State of Georgia, have invented certain new and useful Improvements in Woodworking Tools, of which the following is a specification.

This invention relates to wood working tools, and more particularly to expansion dado cutters.

An object of the invention is the provision of a device for cutting grooves employing a pair of cutters, each of which is provided at one end with a single tooth to make a sheer cut and at the other end with saw teeth.

A further object of the invention is the provision of a cutter of this type which may be placed on a shaft of a table saw, arbor, or other revolving shaft.

In the accompanying drawings, I have shown one embodiment of the invention. In this showing:

Figure 1 is a side elevation,

Figure 2 is an end elevation showing the device arranged on a shaft,

Figure 3 is a central vertical sectional view in a plane parallel to Figure 2, and, Figure 4 is a detail view of spacing washers employed in connection with the cutter.

Referring to the drawings, the reference numerals 1 and 2 designate the blades of the cutter. These blades are wedge shaped in cross section and taper to a cutting edge 3, which is provided with saw teeth 4. The opposite edges 5 of the blades which are of substantial thickness are each provided with a cutting tooth 6, adapted to make a sheering cut. The blades are adapted to be mounted on a shaft 7 and a collar 8 is arranged on the shaft to prevent movement of the blades in one direction. Washers 9 may be arranged between the blades to space them. Each of the blades is provided with a pin 10 adapted to be received in an opening 11 in the other blade to maintain the blades in the desired relative position. The shaft is provided with a threaded end portion 12 and a nut 13 is arranged thereon.

The operation of the device is as follows:

As shown in Figures 2 and 3 of the drawings, the thinner edge of the blades extends further from the center of the shaft than the other end, whereby the saw teeth 4 project beyond the cutting tooth 6. As the cutter is revolved on the shaft, the saw teeth cut into the wood and the cutting teeth 6 then engage the wood to make a sheer cut. A groove of any desired size may be cut smoothly without splintering or tearing the wood. By varying the number of washers 9 between the blades, the width of the groove may be regulated. The device further eliminates the possibility of one of several circular saws cutting deeper than the other, thus resulting in a rough groove.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described a revolving shaft, a pair of tapered blades arranged on said shaft, each of said blades being provided with saw teeth on one end and a cutting tooth on the other end, said blades being adapted to be arranged beside each other, with the cutting teeth of one blade extending in the opposite direction from the cutting teeth of the other blade.

2. In a device of the character described a revolving shaft, a pair of tapered blades arranged on said shaft, each of said blades being provided with saw teeth on one end and a cuttitng tooth on the other end, said blades being adapted to be arranged beside each other with the cutting teeth of one blade extending in the opposite direction from the cutting teeth of the other blade, and means for retaining said blades in said position.

3. In a device of the character described a revolving shaft, a pair of tapered blades arranged on said shaft, each of said blades being provided with saw teeth on one end and a cutting tooth on the other end, said blades being adapted to be arranged beside each other with the cutting teeth of one blade extending in the opposite direction from the cutting teeth of the other blade, each of said blades being provided with an opening, and pins carried by said blade and adapted to enter the opening in the other blade.

4. In a device of the character described a revolving shaft, a pair of tapered blades arranged on said shaft, each of said blades being provided with saw teeth on one end and a cutting tooth on the other end, said blades being adapted to be arranged beside each other with the cutting teeth of one blade extending in the opposite direction from the cutting teeth of the other blade, the saw teeth of each blade projecting beyond the cutting tooth of the other blade.

5. In a device of the character described, a revolving shaft, a pair of tapered blades adapted to be arranged on said shaft adjacent each other, each of said blades being provided with saw teeth on one end and a cutting tooth on the other end, the cutting teeth of one blade extending in the opposite direction from the cutting teeth of the other blade, and means for regulating the distance between said blades.

6. In a device of the character described, a revolving shaft, a pair of tapered blades arranged on said shaft, each of said blades being provided with saw teeth on its thinner edge and a single cutting tooth on its opposite edge, said blades being arranged with the cutting teeth extending in opposite directions, and means for retaining said blades in said position.

In testimony whereof, I affix my signature in presence of two witnesses.

JESSE D. WARE.

Witnesses:
DAVID C. STUBBS,
W. B. STUBBS.